Figure 1:
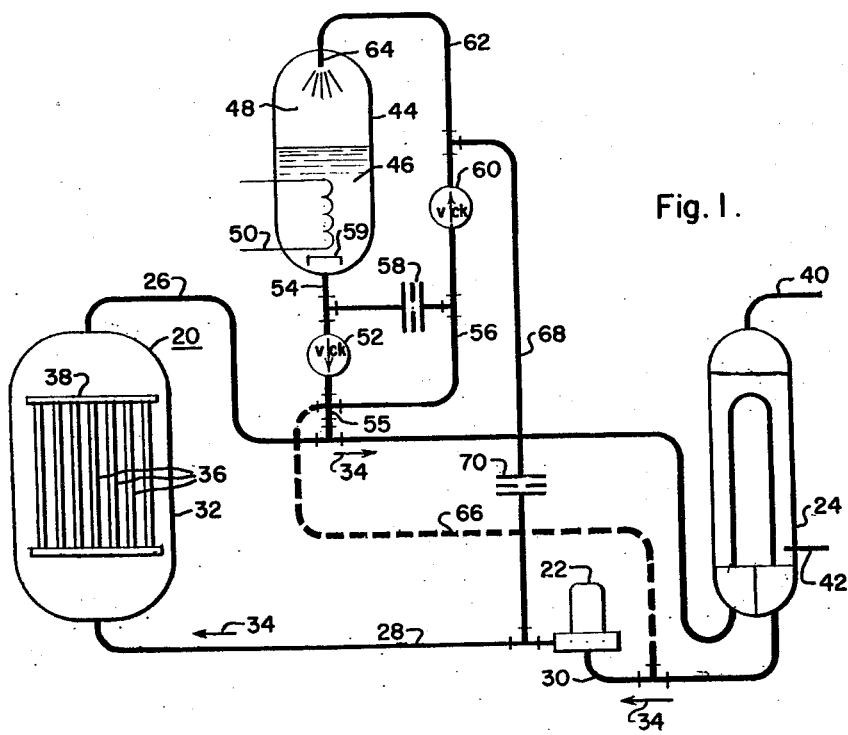

Oct. 23, 1962

J. WAINRIB 3,060,110

PRESSURE CONTROLLING SYSTEM

Filed Aug. 13, 1957

United States Patent Office 3,060,110
Patented Oct. 23, 1962

3,060,110
PRESSURE CONTROLLING SYSTEM
Jules Wainrib, Edgewood, Pa., assignor to Westinghouse Electric Corporation, East Pittsburgh, Pa., a corporation of Pennsylvania
Filed Aug. 13, 1957, Ser. No. 677,942
13 Claims. (Cl. 204—193.2)

The invention forming the subject of the ensuing disclosure is related to a self-proportioning pressure controlling system and, more particularly, to one which is adapted for employment in conjunction with a coolant system associated with a source of heat or of other usable energy.

The pressure controlling system of the invention is adapted for use in those applications wherein a liquid vehicle under considerable pressure is employed to extract heat from a suitable heat source or to cool equipment associated with sources of usable energy. The source may include any type of engine or mechanism which is cooled by or in which heat is transferred to a pressurized cooling system. Although not limited thereto, the invention in its illustrative modification, which is described herein, is applied to a nuclear power plant wherein a quantity of a fissionable isotope, such as U 233, U 235 or PU 239, is maintained, which isotope is capable of supporting and maintaining a chain reaction within the fissionable material. In several types of nuclear plants, a nuclear reactional vessel and one or more coolant loops associated therewith are maintained under a pressure permitting an adequate heat transfer characteristic within the coolant liquid employed therefor without subjecting the same to boiling in those areas of the coolant system which are juxtaposed to the fissionable material, or in other heated portions of this system.

In the operation of the aforesaid nuclear power plant, the nuclear heat evolved from the chain reaction is usually conducted by a primary coolant system to a steam generator where it is converted into steam and thence to electrical energy by well-known means, such as by a steam turbine driven electrical generator. The normal power demand fluctuations cause wide changes in pressure and volumes in the steam generator and in the coolant system employed in conjunction with the nuclear power plant due to the varying amounts of required steam and the likewise varying amounts of heat extracted from the nuclear reactor through its aforesaid coolant system. When a pressurized coolant system is employed for the nuclear reactional vessel, the aforesaid changes in pressure are apt to cause boiling within the coolant liquid, particularly in those areas of the coolant system which are juxtaposed to the aforesaid fissionable material. Such boiling can cause coolant vapor blanketing of the nuclear fuel elements with an attendant, dangerously large differential temperature between the elements and the coolant. As a result, rupture or destruction by melting of one or more fuel elements can occur with release of hazardous, radioactive material into the coolant system. In extreme cases, the entire reactor core can be melted down.

Similar undesirable fluctuations, of a damped nature, are caused when the reactor control rods are inserted or withdrawn for purposes of controlling the nuclear reactor. All of the aforementioned pressure and volume fluctuations complicate designing and operation of the nuclear reactor and of the auxiliary equipment usually associated therewith, and more particularly, necessitate added structural strength, size, instrumentation, controls, and the like.

For the foregoing reasons, it has been found expedient to provide a pressure regulating system which is not only fully automatic or self-proportioning in its operation, but which is able to control the pressure fluctuations, in the system for which it is utilized, within a comparatively narrow range.

It has previously been suggested that one or more surge tanks or the like be associated in various arrangements within the coolant system in order to absorb large pressure or volume variations within the coolant system. Although these arrangements have been found adequate in some applications, they do not produce a desirably close degree of control over the coolant fluid pressure, which control is required in many applications. Furthermore, the additional equipment required is complex in manufacture and is further complicated by conformance with appropriate A.S.M.E. safety regulations with regard to component safety valves and the like.

It has likewise been proposed to employ in conjunction with a heated pressurizer vessel a number of valves which are capable of remote operation for the purpose of counteracting increases and decreases in coolant fluid pressure. This prior arrangement is not fully automatic or self-acting and, therefore, since it requires either manual control or other external control it is susceptible to human or instrumentational error. Moreover, complicated controlling circuitry and the like were required, which not only increased the cost of this prior arrangement but rendered it difficult to confine the coolant pressure within desired narrow limits.

In view of the foregoing, an objective of the invention is the provision of fully automatic or self-acting novel means associated with the pressurized liquid system for maintaining the pressure of the system within predetermined limits. A provision of means for compensating quickly for both increases and decreases in the pressure of the system additionally is contemplated by the invention. It is further intended, in accordance with the invention, that a novel means be provided for preventing accumulation of impurities within the pressure controlling system. It is also contemplated by the present invention that the novel controlling system of the invention be so arranged that the controlling system can be associated with the fluid system being controlled thereby without the provision of additional pumping means and the like, and that the pressure controlling system be further arranged so that a minimum of component parts therefor are required. Still another objective of the invention is the provision of a pressure controlling system which can be coupled to the system being controlled in such a manner that the necessity of additional safety valves is obviated.

Figure 2:
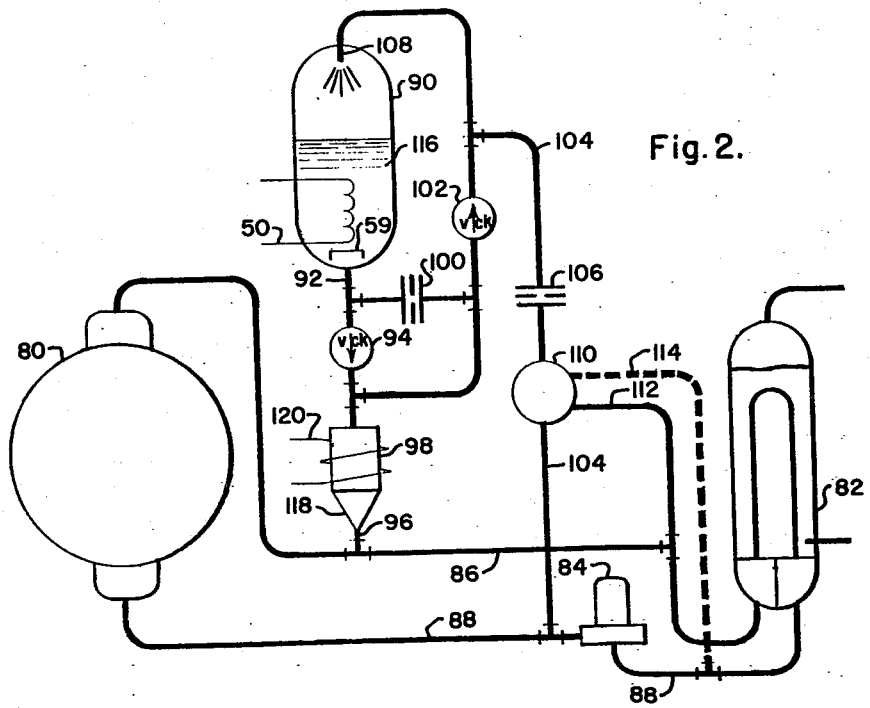

These and other objects, features, and advantages of the invention will be made apparent throughout the ensuing description of exemplary modifications thereof, which description is to be read in conjunction with the accompanying drawings, wherein:

FIGURE 1 is a schematic fluid circuit diagram of one form of a pressure controlling system arranged according to the invention and associated, in this exemplary modification thereof, with a coolant system for a nuclear reactor; and FIG. 2 is a schematic fluid circuit diagram illustrating another form of the invention associated in this example with a homogeneous or circulating fuel type reactor and arranged in accordance with the teachings of this invention.

Within the contemplation of the invention, a pressure controlling system is provided, which system has means associated therewith and operative upon a tendency to increase in pressure of the system for condensing a portion of a vapor confined within an enclosed space within the pressure controlling system and for providing additional volume capable of absorbing the accompanying increase in liquid volume of the system being controlled. Means also are associated with the pressure controlling system for providing the release of sensible heat to the aforesaid vapor space upon a tendency to decrease in pressure of the system in order that the resulting increased volume of the vapor will compensate the decrease in liquid volume within the aforesaid controlled system. It is further contemplated by the invention that a comparatively small flow of liquid through the pressure controlling system be maintained continuously while the controlling system is being used in order to prevent the accumulation of impurities within the controlling system. The pressure controlling system as proposed by the invention is adaptable particularly for use with any form of heat producing device or other energy producing or utilizing device, which is cooled by a pressurized liquid coolant system and more particularly with such a coolant system wherein it is desired to maintain the pressure thereof within relatively narrow limits. More specifically, the pressure controlling system of the invention is adaptable in modifications thereof for use with either a homogeneous or heterogeneous type reactor including, in the case of the latter, a pressurized water reactor or one employing another type of pressurized liquid coolant.

Referring now more particularly to FIGURE 1 of the drawings, the illustrative form of the invention exemplified therein is adapted for use with a nuclear reactor 20 or other source of heat and a pressurized liquid coolant system therefor including a pump 22, a steam generating heat exchanger 24, or other cooling or heat utilizing means. The pump 22 is arranged to circulate a liquid coolant through a primary coolant circuit for the reactor 20, which circuit includes an outgoing conduit 26 and a returning conduit 28. The steam generating heat exchanger 24 or the like is coupled to the inlet side of the pump 22 through a conduit 30 all of which are included in the aforesaid primary coolant circuit, and accordingly, the pump 22 is operated to circulate the coolant liquid through the reactor 20 and through the conduits 26 and 28 in the direction indicated by flow arrows 34. The coolant liquid is circulated in a quantity sufficient to prevent overheating of the nuclear fuel elements 36, which are suspended within the reactor core 38, with the latter being in turn supported within a reactional vessel 32. The heat exchanger 24 is provided with an additional outgoing conduit 40 for suppling steam to a turbine (not shown) or other suitable steam utilizing device and with a feed line 42 for conducting condensate or spent steam back to the heat exchanger 24.

A suitable pressure controlling system desirably is coupled to the outlet conduit 26 and is arranged to compensate for volume or density fluctuations and the attendant tendency to fluctuating pressure within the reactor coolant system is occasioned by vagaries occurring either within the heat exchanger 24 or within the reactor 20 or other portions of the coolant system. One form of pressure controlling system includes a pressurizing vessel 44, the lower portion 46 of which is filled partially with a volatile liquid. The remainder or upper portion 48 of the space within the pressurizing vessel is normally occupied by a vapor of the aforesaid liquid. The aforedescribed coolant system of the reactor is maintained under the desired pressure by means of an electrical heating coil 50 or other suitable heating means suspended within the liquid portion 46 of the pressurizing vessel, which heating coil is capable of maintaining a desired quantity of vaporized coolant within the vessel 44. The vaporized coolant thus produced then operates to force a portion of the liquid contained within the vessel 44 downwardly through a downwardly directing check valve 52 and through conduits 54 and 55 which couple the lower or liquid portion 46 of the pressurizing vessel to the outgoing conduit 26 of the reactor coolant system. A small proportion of this liquid will flow, of course, through the orifice 58 and the conduit 56, presently to be described and thence into the conduit 26. The amount of heat supplied to the liquid within the pressurizing vessel 44, of course, is adjusted to attain the desired operating pressure within the reactor coolant system.

During a positive transient, i.e., a temperature or volume increase resulting in a tendency to an increased pressure in the main coolant system, a volume of coolant liquid will be forced upwardly into the conduit 55. However, the flow of liquid upwardly through the conduit 55 closes the check vale 52, whereupon the coolant liquid is diverted into a bypassing conduit 56. Thence, the flow of the coolant is divided into two streams; with one stream being diverted through the flow-limiting orifice 58 into the bottom or liquid portion 46 of the pressurizing vessel 44 through the upper portion of the conduit 54, or through another port (not shown), if desired, and the other stream through an upwardly directing check valve 60, employed to prevent escape of vapor from the top portion 48 of the vessel 44, and conduit 62 to a spray nozzle or other suitable vapor condensing means 64 mounted in the vapor portion 48 or adjacent the top wall of the pressurizing vessel. A suitably shaped baffle 59 desirably is disposed adjacent the entrance of the conduit 54 at the bottom portion of the pressurizing vessel 44 to avoid imparting thermal shock to the heating element 50 and to avoid complete mixing of the cooler incoming coolant with the liquid normally contained within the pressurizing vessel. Thus a conservation of heat energy supplied by the heating element 50 is effected, for in most cases only this cooler liquid will be ejected from the vessel 44 in the event of a negative transient within the controlled system, as presently to be described.

When thus impelled by the aforesaid positive transient of the coolant system, that portion of the liquid flowing through the nozzle 64, being relatively cooler than the heated liquid normally contained within the pressurizing vessel 44, operates to condense at least a portion of the vapor confined within the space 48 of the pressurizing vessel. Additional space for the liquid contained within the coolant system is thereby afforded, which space is filled by the other stream of the coolant liquid diverted as aforesaid into the bottom of the pressurizing vessel through the flow-limiting orifice 58. The orifice 58 is designed or sized, of course, so that proper proportions of the coolant entering the bypassing conduit 56 will be diverted as aforesaid with the result that a wide range of positive transients within the aforesaid coolant system will be exactly balanced by the increase in volume of this system afforded by condensation of the vapor contained within the space 48 of the pressurizing vessel 44. In those applications wherein the aforesaid coolant system is subjected to severe positive transients and the coolant liquid diverted to the spray nozzle 64 of the pressurizing vessel 44 is not of low enough temperature to condense a sufficient quantity of the vapor 48, the lower portion of the conduit 55 can be omitted and the check valve 52 together with the conduit 56 can, instead, be coupled to the outlet side of the heat exchanger 24 through a suitable conduit, such as that indicated by the dashed lines 66. Thus, a relatively cooler liquid is available for ejection from the spray nozzle 64 in order to condense part of the vapor 48. Alternatively, the temperature of the coolant flowing to the spray nozzle 64 can be lowered by providing a reservoir tank and cooling means therefor in the conduit 55, which tank is similar to the reservoir tank 98 illustrated in and described in connection with FIG. 2 of the drawings. It will be obvious, in some applications, that the orifice 58 and associated connection to the conduit 54 can be omitted with the result that all of the liquid entering the conduits 55 and 66 will be admitted at the top portion of the vessel 44.

In the event of a negative transient, i.e., a temperature or volume decrease and the resultant tendency to decreased pressure within the coolant system, the pressure of the liquid maintained within the pressurizing vessel 44, which is normally equal to the desired pressure of the coolant system, forces part of the liquid 46 downwardly through the conduit 54, the check valve 52 and the conduit 55 or 66, as the case may be, and into the coolant system. This addition of the more highly pressurized portion of liquid coolant contained within the pressurizing vessel serves not only to at least partially compensate the aforesaid negative transient of the coolant system, but in addition, the attendant decrease in pressure exerted upon the liquid contained within the pressurizing vessel portion 46, which heretofore was in equilibrium with the vapor within the vessel, causes a portion of this liquid to become vaporized, and the vapor pressure thereof tends to maintain the desired pressure normally existing within the pressurizing vessel and consequently to maintain the normal pressure of the controlled coolant system. Accordingly, the liquid contained within the pressurizing vessel continues to flow downwardly through the check valve 52 and associated conduits until the negative transient within the coolant system substantially is compensated. At this point, the heating element 50 is activated, by suitable known controlling means, to make up the aforesaid loss in sensible heat of the liquid.

When the aforedescribed pressure controlling system is in use, a relatively small flow of coolant liquid desirably but not necessarily is maintained continuously through the pressurizing vessel 44 and associated components in order to prevent accumulation of impurities within the pressurizing vessel and to maintain the check valves 52 and 60 in an operative condition. One arrangement for maintaining the coolant flow includes a conduit 68 which is desirably coupled to the inlet conduit 28 adjacent the outlet side of the pump 32. A flow limiting orifice 70 is connected in the conduit 68 and the other end of the conduit 68 is connected via the conduit 62 to the spray nozzle 64. Alternatively, the conduit 68 can be coupled directly to the top wall of the vessel 44. The flow limiting orifice 70 is selected so that a relatively small flow is maintained during operation of the controlling system, through the pressurizing vessel 44 and the check valve 52 in order to prevent the accumulation of impurities therein. The flow of liquid through the conduit 68 also serves to maintain the check valve 60 in its normally closed position to ensure the confinement of vapor to the space 48. The heating means 50 for the pressurizing vessel and the flow limiting orifice 70 are further selected so that a normal operating pressure is maintained within the reactor coolant system in the absence of the aforesaid system transients therein when the aforedescribed flow is being maintained through the pressurizing vessel. Inasmuch as the conduit 68 and the conduit 55 are coupled in parallel with the reactor 20, or in parallel with both the reactor 20 and the heat exchanger 24 in the event the conduit 56 is employed, the pressure drop existing across one or both of the reactor and the heat exchanger eliminates the necessity of providing additional pumping means for maintaining a flow of coolant liquid through the conduit 68.

As better shown in FIG. 2 of the drawings, the pressure controlling system of the invention is readily adaptable for use with a homogeneous type nuclear reactor employing, for example, a circulating slurry comprising a pulverulent form of one of the aforesaid fissionable materials suspended in a suitable liquid vehicle. The vehicle is additionally employed for cooling or moderating the pulverulent material or both.

This slurry is circulated through a reactional vessel 80, large enough to contain a critical mass of the fissionable material suspended in the slurry, and a shielded steam generating heat exchanger 82, by means of a slurry pump 84 and conduits 86 and 88. A pressurizing vessel 90, which is generally similar to the pressurizing vessel 44, described heretofore in connection with FIG. 1 of the drawings, is coupled to the slurry conduit 86 through a conduit 92 having a downwardly-directing check valve 94 disposed therein and joining a conduit 96 which is connected to the slurry conduit 86. In the conduit 96 is coupled a reservoir tank 98, the function of which is presently to be elaborated upon. The pressurizing vessel 90 is provided desirably with a flow limiting orifice 100 and also with a check valve 102 and associated piping arranged for the purpose of compensating system transients in the slurry circuit, in a manner such as that described heretofore in connection with FIG. 1.

In order to prevent the accumulation of concentrated slurry within the pressurizing vessel 90 and other components of the pressure controlling system, a relatively small stream of slurry vehicle with the pulverulent material removed therefrom is maintained continuously through the pressure controlling system when the latter is in use. Additional means are desirably provided for preventing surges of unseparated slurry into the pressure controlling system during a sudden increase of pressure within the heat exchanger 82, the reactional vessel 80, or other portions of the slurry system.

One arrangement for maintaining the aforesaid stream of separated slurry vehicle through the pressure controlling system includes a conduit 104 of a relatively small diameter, which is coupled to the pressure side of the pump 84. The conduit 104 is coupled through a flow-limiting orifice 106 to a spray nozzle 108 or otherwise to the top portion of the pressurizing vessel 90 and, thus, is arranged to admit liquid to the aforesaid vapor space in substantially the same manner as that described in connection with the conduit 68 and the flow limiting orifice 70 of FIG. 1 of the drawings. Inserted in the conduit 104, however, between the pressure side of the pump 84 and the flow limiting orifice 106 is a centrifugal or cyclone slurry separator 110 or solid particle separating device, of conventional design. A relatively small portion of the circulating slurry thus is admitted to the slurry separator 110 through the small diameter conduit 104 and subsequently the somewhat concentrated slurry emitted by the separator 110 is returned to the slurry conduit 86 by a return conduit 112. The slurry separator 110 desirably is operated by the pressure drop existing between the pressure side of the pump 84 and the conduit 86 and, accordingly, the pressure drop existing through the reactional vessel 80 is applied to the slurry separator in this example. In those cases wherein the aforesaid pressure drop is inadequate for the proper operation of the slurry separator, the return conduit 112 can be omitted and the slurry separator 110 alternatively can be connected to the outlet side of the heat exchanger 82 by means of another return conduit indicated by the dashed lines 114. In this latter arrangement, of course, the full pressure drop developed by the pump 84 is utilized for operating the slurry separator.

In the slurry separator 110, a relatively small portion of the vehicle is extracted from the slurry flowing thereto and is conducted through the orifice 106 disposed in the upper portion of the conduit 104 to the pressurizing vessel 90. Thus, a relatively small but continuous flow of separated slurry vehicle is maintained through the pressure controlling system, the amount of which is determined by proper selection of the orifice 106. Consequently, accumulation of slurry is prevented within the pressurizing vessel, wherein the heating coil 50 operates to vaporize a portion of the slurry vehicle. The aforesaid flow of slurry vehicle in addition maintains the reservoir tank 98 substantially free of slurry particles, to which tank the vehicle flows through the downwardly directing check valve 94 from the pressurizing vessel, substantially free of slurry particles.

Upon the occasion of a negative transient of the circulating slurry system of FIG. 2, a portion of the heated slurry vehicle within a lower portion 116 of the pressurizing vessel 90 flows downwardly through the conduits 92 and 96, through the check valve 94 and the reservoir tank 98 into the slurry conduit 86. As explained heretofore in connection with FIG. 1, the sudden release of this quantity of liquid from the pressurizing vessel 90 causes sensible heat to be released to vaporize additional coolant liquid or vehicle contained within the pressurizing vessel 90 and, accordingly, the aforesaid negative transient of the circulating slurry system is compensated.

On the other hand, positive transient in the slurry system causes a portion of the slurry to be forced upwardly through the lower part of the conduit 96 and into the vehicle reservoir tank 98. This surge of slurry accordingly displaces an equivalent portion of the separated vehicle normally contained within the reservoir tank 98, the displacement of which vehicle operates to close the check valve 94 and to divide the displaced vehicle into discreet streams thereof, which pass respectively through the flow limiting orifice 100 and the upwardly directing check valve 102. Thence, the streams of separated vehicle flowing from the tank 98 are admitted respectively through the bottom of the pressurizing vessel 90 and the spray nozzle 108. That portion of the vehicle issuing from the spray nozzle 108 operates to condense a portion of the vaporized vehicle confined within the pressurizing vessel 90 and to provide thereby additional space within the pressurizing vessel for compensating the positive transient, as explained more fully in connection with FIG. 1 of the drawings. The separated vehicle which is displaced from the reservoir tank 98 is substantially lower in temperature due to its being normally relatively stagnant within the reservoir tank 98 and will therefore be more effective in condensing the aforesaid vapor when emitted from the spray nozzle 108.

It is contemplated that the reservoir tank 98 be provided of sufficient size such that the range of transient fluctuations encountered in the operation of the circulating system will not force a volume of circulating slurry into the reservoir tank which is greater than the volume of the tank. Obviously, however, the tank 98 cannot be made large enough to contain a critical mass of the slurry of fissionable material. The reservoir tank 98 is provided desirably with a conical bottom section 118 in order to facilitate the removal of slurry particles therefrom. In some applications of the invention, condensation of the aforementioned vapor confined with the pressurizing vessel 90, can be facilitated by providing the reservoir tank 98 with a cooling coil or jacket 120 or with other suitable cooling means for the liquid contained therewithin. In still other applications a cyclone slurry separator (not shown), such as that described in "Process Equipment News," Chemical Engineering, pages 212–213, November 1953, can be used in conjunction with the tank 98 by coupling the latter-mentioned separator in the conduit 96, or alternatively can be utilized at this location in place of the reservoir tank 98.

It will be appreciated that the inventive arrangement of FIG. 1 can be used in a substantially unchanged form when employed with some proposed types of homogeneous reactors for an example, those utilizing a circulating aqueous or other liquid solution of a salt of a fissionable material, or a circulating, metallo-organic liquid compound of a fissionable isotope.

From the foregoing, it will be apparent that a number of novel forms of a pressure controlling system have been disclosed herein. The pressure controlling system of the invention can be employed in conjunction with the coolant system of either a homogeneous or heterogeneous type nuclear reactor or can be applied with equal facility to any pressurized liquid system which is subject to pressure fluctuations. In this application, the terms "liquid," "liquid system," "liquid vehicle," "coolant," and the like are intended to include any fluid system having a vaporizable, liquid component.

Therefore, numerous modifications of the exemplary forms of the invention disclosed herein will occur to those schooled in the art without departing from the spirit and scope of the invention. Moreover, it is to be understood that certain features of the invention can be employed without a corresponding use of other features.

I claim as my invention:

1. A pressure controlling system for a pressurized liquid system, said controlling system comprising a vessel, means for heating at least a portion of the vessel, a first conduit coupling the bottom portion of said vessel to said liquid system, said first conduit having a first check valve coupled therein, said check valve being disposed so as to direct flow only away from said vessel, a spray nozzle supported within said vessel adjacent an upper wall thereof, a second conduit extending through said upper vessel wall and coupling said spray nozzle to said liquid system, a second check valve disposed in said second conduit so as to direct flow only toward said spray nozzle, and a flow restricting conduit coupling said first and said second conduits at points adjacent the inlets of said first and said second check valves, respectively.

2. A pressure controlling system for a pressurized liquid system, said controlling system including a vessel, means for heating at least a portion of the vessel, a conduit coupling a bottom portion of said vessel to said liquid system, a check valve disposed in said conduit so as to direct flow only away from said vessel, vapor condensing means mounted in the upper portion of said vessel for mixing a portion of said liquid when supplied thereto with at least a portion of the vapor contained in said upper vessel portion in order to condense said vapor portion, conduit flow dividing means coupled to said liquid system for conducting said liquid to said vapor condensing means and said bottom portion of said vessel, respectively, and a flow restricting conduit coupling said vapor condensing means to a point of higher pressure of said liquid system.

3. A pressure controlling system for a pressurized liquid system, said controlling system including a vessel, means for heating at least a portion of the vessel, a conduit coupling a bottom portion of said vessel to said liquid system, a check valve disposed in said conduit so as to direct flow only away from said vessel, vapor condensing means mounted in the upper portion of said vessel for mixing a portion of said liquid when supplied thereto with at least a portion of the vapor contained in said upper vessel portion in order to condense said vapor portion, conduit flow dividing means coupled to said liquid system for conducting said liquid to said vapor condensing means and to said bottom portion of said vessel, respectively, a second check valve coupled in that portion of said flow dividing means leading to said vapor condensing means so as to direct flow only toward said condensing means, and a flow restricting conduit coupling said flow dividing portion at a position adjacent the outlet of said second check valve to a point of higher pressure in said liquid system.

4. A pressure controlling system for a pressurized slurry system, said controlling system comprising a vessel, means for heating at least a portion of the vessel, a conduit coupling a bottom portion of said vessel to a reservoir tank, a second conduit coupling a bottom portion of said tank to said slurry system, a check valve disposed in said first conduit so as to direct flow only from said vessel to said tank, vapor condensing means mounted in the upper portion of said vessel for mixing a portion of said liquid when supplied thereto with at least a portion of the vapor contained in said upper vessel portion in order to condense said vapor portion, flow dividing conduit means coupled to said first conduit between said check valve and said tank for conducting liquid flowing from said tank to said vessel bottom portion and to said vapor condensing means, respectively, flow restricting conduit means coupling said vapor condensing means to a point of higher pressure in said slurry system, and slurry separating means connected in said last-mentioned conduit means, whereby a constant flow of slurry vehicle is conveyed to said vessel during operation of said system in order to displace slurry particles therefrom.

5. A pressure controlling system for a pressurized slurry system, said controlling system comprising a vessel, means for heating at least a portion of the vessel, a conduit coupling a bottom portion of said vessel to a reservoir tank, a second conduit coupling a bottom portion of said tank to said slurry system, a check valve disposed in said first conduit so as to direct flow only from said vessel to said tank, vapor condensing means mounted in the upper portion of said vessel for mixing a portion of said liquid when supplied thereto with at least a portion of the vapor contained in said upper vessel portion in order to condense said vapor portion, flow dividing conduit means coupled to said first conduit between said check valve and said tank and for admitting a portion of the liquid flow from said tank through a flow restricting orifice to said vessel bottom portion and for admitting another portion of said flow through a second check valve to said vapor condensing means, said second check valve being disposed so as to direct flow only toward said vapor condensing means, flow restricting conduit means coupled to said flow-dividing conduit means adjacent the outlet of said second check valve and to a point of higher pressure in said slurry system, and slurry separating means diposed in said last-mentioned conduit means, whereby a constant flow of slurry vehicle is conveyed to said vessel during operation of said system in order to displace slurry particles therefrom.

6. A pressure controlling system for a pressurized liquid system, said controlling system including a vessel, means for heating at least a portion of the vessel, a conduit coupling a bottom portion of said vessel to said liquid system, a check valve disposed in said conduit so as to direct flow only away from said vessel, vapor condensing means mounted in the upper portion of said vessel for mixing a portion of said liquid when supplied thereto with at least a portion of the vapor contained in said upper vessel portion in order to condense said vapor portion, conduit flow-dividing means coupled to said liquid system for conducting said liquid to said bottom portion of said vessel and to said vapor condensing means, respectively, and a flow-restricting conduit coupling said upper portion to a point of higher pressure of said liquid system.

7. A pressure controlling system for a pressurized slurry system, said controlling system comprising a vessel, means for heating at least a portion of the vessel, a conduit coupling a bottom portion of said vessel to a reservoir tank, a second conduit coupling a bottom portion of said tank to said liquid system, a check valve disposed in said first conduit so as to direct flow only from said vessel to said tank, vapor condensing means mounted in the upper portion of said vessel for mixing a portion of said liquid when supplied thereto with at least a portion of the vapor contained in said upper vessel portion in order to condense said vapor portion, flow dividing conduit means coupled to said first conduit between said check valve and said tank for admitting liquid flowing from said tank to said vessel bottom portion and to said vapor condensing means, respectively, and flow restricting means coupling said vapor condensing means to a source of slurry vehicle, whereby a constant flow of slurry vehicle is conveyed to said tank to said vessel during operation of said system in order to displace slurry particles therefrom.

8. A pressure controlling system for a pressurized slurry system, said controlling system comprising a vessel, means for heating at least a portion of the vessel, a conduit coupling a bottom portion of said vessel to a settling tank, a second conduit coupling a bottom portion of said tank to said liquid system, a check valve disposed in said first conduit so as to direct flow only from said vessel to said tank, vapor condensing means mounted in the upper portion of said vessel for mixing a portion of said liquid when supplied thereto with at least a portion of the vapor contained in said upper vessel portion in order to condense said vapor portion, and flow dividing and restricting conduit means coupled to said first conduit between said check valve and said tank for admitting liquid flowing from the top of said tank to said vessel bottom portion and to said vapor condensing means, respectively, whereby flow of settled-out slurry particles in said tank to said vessel is minimized.

9. A pressure controlling system for a pressurized liquid system, said controlling system including a vessel, means for heating at least a portion of the vessel, a conduit coupling a bottom portion of said vessel to said liquid system, a check valve disposed in said conduit so as to direct flow only away from said vessel, vapor condensing means mounted in the upper portion of said vessel for mixing a portion of said liquid when supplied thereto with at least a portion of the vapor contained in said upper vessel portion in order to condense said vapor portion, conduit flow dividing means coupled to said liquid system for admitting said liquid to said vapor condensing means and said bottom portion of said vessel, respectively, and a mixing preventing baffle member disposed in said vessel adjacent said bottom vessel portion.

10. A pressure controlling system for a pressurized liquid system, said controlling system including a vessel, means for heating at least a portion of the vessel, a conduit coupling a bottom portion of said vessel to said liquid system, a check valve disposed in said conduit, so as to direct flow only away from said vessel, a reservoir tank coupled in said conduit, vapor condensing means mounted in the upper portion of said vessel for mixing a portion of said liquid when supplied thereto with at least a portion of the vapor contained in said upper vessel portion in order to condense said vapor portion, and conduit flow dividing and restricting means coupled to said tank for conducting said liquid to said vapor condensing means and to said bottom portion of said vessel, respectively, in by-passing relation to said check valve.

11. A pressure controlling system for a pressurized slurry system, said controlling system including a vessel, means for heating at least a portion of the vessel, a conduit coupling a bottom portion of said vessel to said liquid system, a check valve disposed in said conduit so as to direct flow only away from said vessel, a settling tank coupled in said conduit, cooling means for said tank, vapor condensing means mounted in the upper portion of said vessel for mixing a portion of said liquid when supplied thereto with at least a portion of the vapor contained in said upper vessel portion in order to condense said vapor portion, conduit flow-dividing and restricting means coupled to the top of said tank for admitting said liquid to said vapor condensing means and said bottom portion of said vessel, respectively, whereby flow of settled-out slurry particles in said tank to said vessel is minimized, and a mixing preventing baffle member disposed in said vessel adjacent said bottom vessel portion.

12. A pressure controlling system for a pressurized liquid system, said controlling system including a vessel, means for heating at least a portion of the vessel, a conduit coupling a bottom portion of said vessel to said liquid system, a check valve disposed in said conduit so as to direct flow only away from said vessel, vapor condensing means mounted in the upper portion of said vessel for mixing a portion of said liquid when supplied thereto with at least a portion of the vapor contained in said upper vessel portion in order to condense said vapor portion, conduit means coupling said vapor condensing means and said bottom portion of said vessel to said liquid system, said first and said second-mentioned conduits being coupled to substantially the same point in said liquid system, and a second check valve disposed in said second-mentioned conduit so as to direct flow only toward said top portion.

13. A pressure controlling system for a pressurized liquid system, said controlling system including a vessel, means for heating at least a portion of the vessel, a conduit coupling a bottom portion of said vessel to said liquid system, a check valve disposed in said conduit so as to direct flow only away from said vessel, vapor condensing means mounted in the upper portion of said vessel for mixing a portion of said liquid when supplied thereto with at least a portion of the vapor contained in said upper vessel portion in order to condense said vapor portion, a conduit coupling said vapor condensing means to said liquid system, a second check valve disposed in the last-mentioned conduit so as to direct flow only toward said vapor condensing means, and a flow restricting conduit coupling said vapor condensing mean to a point of higher pressure of said liquid system.

References Cited in the file of this patent

WAPD–RM–187, U.S. Atomic Energy Commission, July 1953, pp. 6–8, 14–16, 23, 29 and 30. (Available Scientific Lib.)

WIAP–12, U.S. Atomic Energy Commission, March 1955, p. 78. Available Scientific Lib.

WIAP–12, U.S. Atomic Energy Commission, March 1955, pp. 15, 16, 65. (Available Scientific Lib.)